United States Patent
Li et al.

(10) Patent No.: US 11,365,779 B2
(45) Date of Patent: Jun. 21, 2022

(54) MAGNETIC LIQUID DAMPING SHOCK ABSORBER

(71) Applicant: Tsinghua University, Beijing (CN)

(72) Inventors: Decai Li, Beijing (CN); Yanwen Li, Beijing (CN); Sijie Ren, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/507,245

(22) Filed: Oct. 21, 2021

(65) Prior Publication Data

US 2022/0128111 A1 Apr. 28, 2022

(30) Foreign Application Priority Data

Oct. 22, 2020 (CN) .......................... 202011141999.3
Oct. 22, 2020 (CN) .......................... 202022376238.8

(51) Int. Cl.
*F16F 7/10* (2006.01)
*F16F 6/00* (2006.01)
*F16L 59/02* (2006.01)

(52) U.S. Cl.
CPC ................ *F16F 7/10* (2013.01); *F16F 6/005* (2013.01); *F16L 59/028* (2013.01);
(Continued)

(58) Field of Classification Search
CPC .......... F16F 7/10; F16F 6/005; F16F 2222/04; F16F 2222/06; F16F 2222/08;
(Continued)

(56) References Cited

U.S. PATENT DOCUMENTS 2,825,034 A * 2/1958 Birchard ................. F28D 20/02
336/61
2,985,106 A * 5/1961 Rhudy ................... H02K 44/06
417/50
(Continued)

FOREIGN PATENT DOCUMENTS

CN 103122965 5/2015
CN 104948627 9/2015
(Continued)

OTHER PUBLICATIONS

CNIPA, Notice of Granting Invention Patent Right for CN Application No. 202011141999.3, dated Apr. 2, 2021.
(Continued)

*Primary Examiner* — Xuan Lan Nguyen
(74) *Attorney, Agent, or Firm* — Hodgson Russ LLP

(57) ABSTRACT

A magnetic liquid damping shock absorber includes a housing, a thermal insulating material layer, a mass block and a magnetic liquid. The housing defines a sealed cavity, the sealed cavity has a first wall face and a second wall face opposite in a first direction and a circumferential wall face located between the first wall face and the second wall face in the first direction. The thermal insulating material layer is provided on an outer surface of the housing, on a wall face of the sealed cavity or in a housing wall of the housing. The mass block is located in the sealed cavity, and the mass block and the housing define a magnetic liquid cavity therebetween. The magnetic liquid is filled in the magnetic liquid cavity.

10 Claims, 3 Drawing Sheets

(52) U.S. Cl.
CPC ......... *F16L 59/029* (2013.01); *F16F 2222/04* (2013.01); *F16F 2222/06* (2013.01); *F16F 2222/08* (2013.01); *F16F 2222/12* (2013.01); *F16F 2234/02* (2013.01)

(58) Field of Classification Search
CPC . F16F 2222/12; F16F 2234/02; F16L 59/028; F16L 59/029
See application file for complete search history.

(56) References Cited

U.S. PATENT DOCUMENTS

| | | | | |
|---|---|---|---|---|
| 3,240,074 | A | * | 3/1966 | Horgan ................... G01C 19/04 74/5 R |
| 4,581,285 | A | * | 4/1986 | Mahefkey, Jr. ....... F16L 59/029 442/378 |
| 2016/0046396 | A1 | * | 2/2016 | Pinney .................. F16L 59/029 165/135 |
| 2019/0162267 | A1 | * | 5/2019 | Barber .................. H05B 6/108 |
| 2019/0338807 | A1 | * | 11/2019 | Willmot ................. B64G 1/402 |

FOREIGN PATENT DOCUMENTS

| | | | |
|---|---|---|---|
| CN | 204677662 | 9/2015 | |
| KR | 20050014934 | 2/2005 | |
| WO | WO-2007014284 A2 * | 2/2007 | ............ F16L 59/028 |
| WO | 2018193640 | 10/2018 | |

OTHER PUBLICATIONS

CNIPA, First Office Action for CN Application No. 202011141999.3, dated Mar. 1, 2021.

Zhu et al., "Damping performance of magnetic fluid dampers in spacecrafts," Journal of Vibration and Shock, 2017, vol. 36, No. 10, pp. 121-126.

* cited by examiner

MAGNETIC LIQUID DAMPING SHOCK ABSORBER

CROSS-REFERENCE TO RELATED APPLICATIONS

This application claims priority to and benefits of Chinese Patent Application Serial No. 202022376238.8, filed on Oct. 22, 2020, and Chinese Patent Application Serial No. 202011141999.3, filed on Oct. 22, 2020, the entire contents of which are incorporated herein by reference.

FIELD

The present disclosure relates to a field of mechanical engineering vibration control, and more particularly to a magnetic liquid damping shock absorber.

BACKGROUND

Magnetic liquid damping shock absorbers are a passive inertial shock absorber that utilizes special buoyancy characteristics of a magnetic liquid. They have advantages of simple structure, safety and reliability, energy saving, etc., and are particularly suitable for complex environment which requires high reliability and low energy consumption, such as space. They are widely used in small amplitude and low frequency vibration damping of components of space craft such as solar panels, antenna, etc.

SUMMARY

A magnetic liquid damping shock absorber according to embodiments of the present disclosure includes: a housing defining a sealed cavity, the sealed cavity having a circumferential wall face, and a first wall face and a second wall face opposite in a first direction, the circumferential wall face being located between the first wall face and the second wall face in the first direction; a thermal insulating material layer provided on an outer surface of the housing, on a wall face of the sealed cavity or in a housing wall of the housing; a mass block located in the sealed cavity, the mass block and the housing defining a magnetic liquid cavity therebetween; and a magnetic liquid filled in the magnetic liquid cavity.

DETAILED DESCRIPTION OF THE DISCLOSURE

Figure 1:
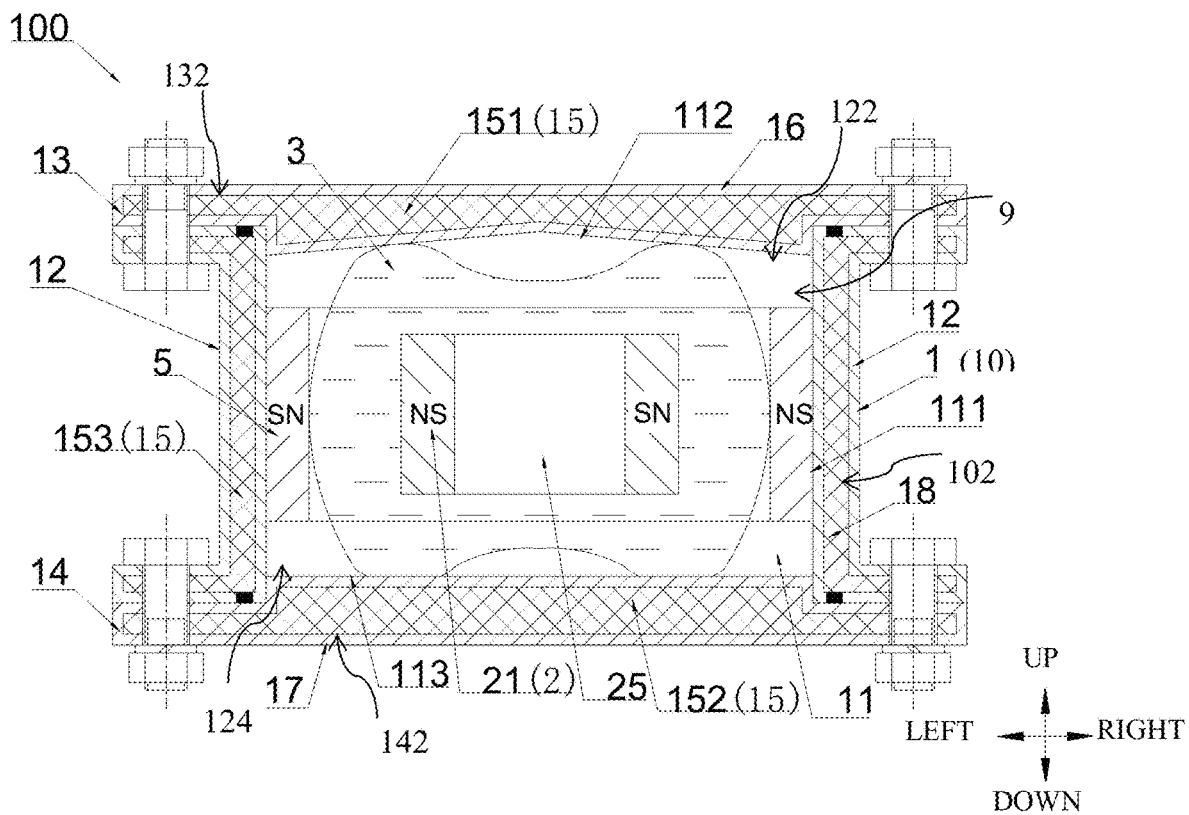
FIG. 1 is a schematic view of a magnetic liquid damping shock absorber according to an embodiment of the present disclosure.

Embodiments of the present disclosure will be described in detail and examples of the embodiments will be illustrated in the drawings. The embodiments described herein with reference to the accompanying drawings are explanatory, which are used to illustrate the present disclosure, but shall not be construed to limit the present disclosure.

Since there is actual working condition of large temperature difference in space—a light side of a planet generally exceeds 100 degrees Celsius, while a dark side of the planet is below minus 100 degrees Celsius. When the magnetic liquid damping shock absorbers in the related art are actually applied in space, the huge temperature difference will seriously affect normal operation of the magnetic liquid shock absorbers orbiting the planet.

A magnetic liquid damping shock absorber 100 according to embodiments of the present disclosure will be described below with reference to FIG. 1. The magnetic liquid damping shock absorber 100 includes a housing 1, a thermal insulating material layer 15, a mass block 2 and a magnetic liquid 3.

The housing 1 defines a sealed cavity 11. The sealed cavity 11 has a circumferential wall face 111, and a first wall face 112 and a second wall face 113 opposite in a first direction. The circumferential wall face 111 is located between the first wall face 112 and the second wall face 113 in the first direction. The thermal insulating material layer 15 is provided on an outer surface of the housing 1, on a wall face of the sealed cavity 11, or in a housing wall 10 of the housing 1. The wall face of the sealed cavity 11 refers to the circumferential wall face 111, the first wall face 112 and the second wall face 113. It should be noted that the thermal insulating material layer 15 being provided on the wall face of the sealed cavity 11 does not means that the thermal insulating material layer 15 needs to be provided on the entire wall face of the sealed cavity 11, but it is possible that the thermal insulating material layer 15 is only provided on a portion of the wall face of the sealed cavity 11. For example, the thermal insulating material layer 15 is provided on the circumferential wall face 111.

The mass block 2 is located in the sealed cavity 11, and a magnetic liquid cavity 9 is defined between the mass block 2 and the housing 1. The magnetic liquid 3 is filled in the magnetic liquid cavity 9, but the magnetic liquid cavity 9 is not full of the magnetic liquid 3. The mass block 2 is suspended in the sealed cavity 11 under the action of the magnetic liquid 3.

With the magnetic liquid damping shock absorber 100 provided by the embodiments of the present disclosure, when mechanical vibration of an object to be damped occurs, the mass block 2 is displaced in the sealed cavity 11, i.e., relative movement between the mass block 2 and the housing 1 occurs. In this process, extrusion, friction and viscous shear occur between the mass block 2 and the magnetic liquid 3, between the magnetic liquid 3 and the housing 1, as well as inside the magnetic liquid 3 to consume energy, achieving a vibration damping effect.

The magnetic liquid damping shock absorber according to embodiments of the present disclosure is provided with the thermal insulating material layer. The thermal insulating material layer can thermally insulate internal members of the magnetic liquid damping shock absorber, in particular the magnetic liquid to reduce temperature change of the magnetic liquid. That is to say, since the magnetic liquid damping shock absorber is provided with the housing having the thermal insulating material layer, and a difference between the temperature of the magnetic liquid when the magnetic liquid damping shock absorber is located on a light side of a planet and the temperature of the magnetic liquid when the magnetic liquid damping shock absorber is located on a dark side of the planet is reduced, mobility and viscosity differences of the magnetic liquid are reduced, facilitating normal operation of the magnetic liquid shock absorber in space working conditions.

Thus, the magnetic liquid damping shock absorber provided by the embodiments of the present disclosure has advantages of stable operation and particularly suitable for space working conditions.

In order for ease of understanding of the technical solution of the present application, hereinafter, the first direction being an up-and-down direction is taken as an example, and the technical solution of the present application is further described. The up-and-down direction is shown by the arrow in FIG. 1. The first wall face 112 is an upper wall face of the sealed cavity 11, and the second wall face 113 is a lower wall face of the sealed cavity 11.

In some embodiments, the housing wall 10 of the housing 1 defines a thermal insulating cavity. The thermal insulating material layer 15 is formed by thermal insulating material filled in the thermal insulating cavity. By way of example, as illustrated in FIG. 1, the housing 1 has a circumferential wall 18, and a first wall 16 and second wall 17 opposite in the first direction (up-and-down direction). The circumferential wall 18 is located between the first wall 16 and the second wall 17 in the first direction. A face of the first wall 16 towards the sealed cavity 11 is the first wall face 112, a wall face of the second wall 17 towards the sealed cavity 11 is the second wall face 113, and a wall face of the circumferential wall 18 towards the sealed cavity 11 is the circumferential wall face 111.

Further, as illustrated in FIG. 1, the sealed cavity 11 is cylindrical. An axial direction of the sealed cavity 11 is along the first direction, i.e., the axial direction of the sealed cavity 11 is along the up-and-down direction. The first wall face 112 and the second wall face 113 are opposite in the axial direction of the sealed cavity 11.

In some embodiments, in order for ease of assembly of the magnetic liquid damping shock absorber 100, the housing 1 includes a housing body and an upper end cap. The housing body has an upward opening, the upper end cap covers the opening and is coupled to the housing body, and the upper end cap serves as the first wall 16 of the housing 1. The housing body includes the second wall 17 and the circumferential wall 18 coupled to the second wall 17. A bottom wall face of the housing body is the second wall face of the sealed cavity 11.

In at least one embodiment, the upper end cap defines the thermal insulating cavity, and the thermal insulating cavity is filled with thermal insulating material to form the thermal insulating material layer; or, the housing body defines the thermal insulating cavity, and the thermal insulating cavity is filled with thermal insulating material to form the thermal insulating material layer; or, the upper end cap defines a first thermal insulating cavity, the housing body defines a second thermal insulating cavity, the first thermal insulating cavity is filled with first thermal insulating material to form a first thermal insulating material layer, and the second thermal insulating cavity is filled with second thermal insulating material to form a second thermal insulating material layer.

In other embodiments, as illustrated in FIG. 1, the housing 1 includes a first body 12, a first end cap 13 and a second end cap 14. The first body 12 has a first opening 122 and a second opening 124 opposite in the first direction. By way of example, an opening direction of the first opening 122 is upward, and an opening direction of the second opening 124 is downward. The first end cap 13 covers the first opening 122 and is coupled to the first body 12, the second end cap 14 covers the second opening 124 and is coupled to the first body 12, and the first body 12, the first end cap 13 and the second end cap 14 define the sealed cavity 11. A wall face of the first end cap 13 towards the sealed cavity 11 is the first wall face 112, a wall face of the second end cap 14 towards the sealed cavity 11 is the second wall face 113, and a wall face of the first body 12 towards the sealed cavity 11 is the circumferential wall face 111.

In at least one embodiment, the first end cap 13 defines a first thermal insulating cavity 132, the second end cap 14 defines a second thermal insulating cavity 142, and the first body 12 defines a third thermal insulating cavity 102. The first thermal insulating cavity 132 is filled with first thermal insulating material to form a first thermal insulating material layer 151, the second thermal insulating cavity 142 is filled with second thermal insulating material to form a second thermal insulating material layer 152, and the third thermal insulating cavity 102 is filled with a third thermal insulating material to form a third thermal insulating material layer 153. By way of example, as illustrated in FIG. 1, the thermal insulating material layer 151, the second thermal insulating material layer 152 and the third thermal insulating material layer 153 wrap the sealed cavity 11, to have a good thermal insulating effect.

In some embodiments, the thermal insulating material layer 15 is formed by a phase-change material, and the phase-change material is filled in the thermal insulating cavity. That is to say, the phase-change material is filled in the thermal insulating cavity within the housing wall 10 of the housing 1 to form the thermal insulating material layer 15, for thermal insulation of internal members of the magnetic liquid damping shock absorber 100.

It could be understood that, when a plurality of insulating cavities are provided and they are relatively independent, the thermal insulating material (e.g., the phase-change material) in each thermal insulating cavity may be different or the same.

In at least one embodiment, the phase-change material is solid-liquid phase-change material. The solid-liquid phase-change material accumulates heat and will convert from solid to liquid (liquefy) when reaching a phase change temperature, and the solid-liquid phase-change material will convert from liquid to solid (solidify) when releasing heat. That is, the liquefying process of the solid-liquid phase-change material is a heat accumulation process, and the solidifying process of the solid-liquid phase-change material is a heat release process.

The magnetic liquid damping shock absorber 100 employs the solid-liquid phase-change material as the thermal insulating material. When the magnetic liquid damping shock absorber 100 runs to the light side of the planet, the solid-liquid phase-change material accumulates heat. When the magnetic liquid damping shock absorber 100 runs to the dark side of the planet, the solid-liquid phase-change material releases heat. Thus, influence of temperature difference on the magnetic liquid 3 is reduced, operational stability of the magnetic liquid damping shock absorber 100 is improved, and applicability of the magnetic liquid damping shock absorber 100 in space is promoted.

Further in at least one embodiment, the phase-change material is an inorganic hydrous salt.

In some embodiments, the mass block 2 is a non-magnetic body, and the magnetic liquid damping shock absorber 100 further includes a first permanent magnet 21 and a second permanent magnet 21 that are coupled to the housing 1. The first permanent magnet 21 and the second permanent magnet 21 are opposite in the first direction (up-and-down direction), and the non-magnetic body (mass block 2) is located between the first permanent magnet 21 and the second permanent magnet 21 in the first direction. In this embodiment, the magnetic liquid damping shock absorber 100 is a shock absorber on basis of magnetic liquid first-order buoyancy principle.

With the magnetic liquid damping shock absorber 100 of the present embodiment, when mechanical vibration of an object to be damped occurs, the non-magnetic body acts as a damping mass block to move relative to the housing 1. Extrusion, friction and viscous shear occur between the non-magnetic body and the magnetic liquid 3, between the housing 1 and the magnetic liquid 3, as well as inside the magnetic liquid 3 to consume energy, achieving a vibration damping effect. In other embodiments, as illustrated in FIG. 1, the mass block 2 is a permanent magnet 21.

The permanent magnet 21 is suspended in the sealed cavity 11 under the action of the magnetic liquid 3. In this embodiment, the magnetic liquid damping shock absorber 100 is a shock absorber on basis of magnetic liquid second-order buoyancy principle.

With the magnetic liquid damping shock absorber 100 of the present embodiment, when mechanical vibration of an object to be damped occurs, the permanent magnet 21 acts as a damping mass block to move relative to the housing 1. Extrusion, friction and viscous shear occur between the permanent magnet 21 and the magnetic liquid 3, between the housing 1 and the magnetic liquid 3, as well as inside the magnetic liquid 3 to consume energy, achieving a vibration damping effect.

In some embodiments, as illustrated in FIG. 1, the mass block 2 (permanent magnet 21) is cylindrical, and an axial direction of the mass block 2 and an axial direction of the sealed cavity 11 are the same as each other. That is, the axial direction of the mass block 2 and the axial direction of the sealed cavity 11 are both along the up-and-down direction.

In at least one embodiment, the mass block 2 is axially magnetized. The mass block 2 being axially magnetized means that a magnetizing direction of the mass block 2 is along its axial direction. For example, the mass block 2 has a first end face and a second end face opposite in its axial direction. The first end face of the mass block 2 is an end face close to the first wall face 112, i.e., an upper end face of the mass block 2. The second end face of the mass block 2 is an end face close to the second wall face 113, i.e., a lower end face of the mass block 2. The first end face and the second end face of the mass block 2 have different magnetic poles. For example, the first end face of the mass block 2 is an N pole, and the second end face of the mass block 2 is an S pole.

In at least one embodiment, as illustrated in FIG. 1, the mass block 2 is radially magnetized. The mass block 2 being radially magnetized means that a magnetizing direction of the mass block 2 is along its radial direction. In some embodiments, the mass block 2 has a central through hole 25, and an axial direction of the central through hole 25 is the first direction. That is to say, the mass block 2 is annular, an inner wall face and an outer wall face of the mass block 2 have different magnetic poles. By way of example, as illustrated in FIG. 1, the outer wall face of the mass block 2 is an N pole, and the inner wall face of the mass block 2 is an S pole.

In some embodiments, as illustrated in FIG. 1, the magnetic liquid damping shock absorber 100 further includes a permanent magnet ring 5. The permanent magnet ring 5 is provided on the circumferential wall face 111, and the mass block 2 (permanent magnet 21) is located at an inner side of the permanent magnet ring 5. That is to say, the mass block 2 is located in an internal cavity of the permanent magnet ring 5 in a direction perpendicular to the first direction. The outer wall face of the mass block 2 and the inner wall face of the permanent magnet ring 5 are opposite in the direction perpendicular to the first direction.

By way of example, as illustrated in FIG. 1, the permanent magnet ring 5 is annular, and each of an axial direction of the permanent magnet ring 5 and an axial direction of the mass block 2 is along the first direction (up-and-down direction). Each of the permanent magnet ring 5 and the mass block 2 is radially magnetized, and magnetizing directions of the permanent magnet ring 5 and the mass block 2 are opposite. Magnetizing directions of the permanent magnet ring 5 and the mass block 2 being opposite means that the outer wall face (inner wall face) of the mass block 2 and the outer wall face (inner wall face) of the permanent magnet ring 5 have opposite magnetic poles. Hence, the outer wall face of the mass block 2 and the inner wall face of the permanent magnet ring 5 have the same magnetic pole. For example, as illustrated in FIG. 1, the outer wall face of the mass block 2 is an N pole, and the inner wall face of the permanent magnet ring 5 is also an N pole.

The outer wall face of the mass block 2 and the inner wall face of the permanent magnet ring 5 have the same magnetic pole. According to the principle of the same poles repelling, the permanent magnet ring 5 can prevent the mass block 2 from colliding with the circumferential wall face 111 in the vibration damping process, which causes failures of vibration damping. Additionally, the permanent magnet ring 5 can also provide a restore force for the mass block 2 to return it to a balance position. The balance position refers to that: when the mass block 2 is not affected by vibration mechanical energy, the mass block 2 and the housing 1 are relatively stationary under the action of the magnetic liquid 3, and in this case the mass block 2 is in the balance position. Moreover, the mass block 2 is located at the inner side of the permanent magnet ring 5, and under the magnetic field of the permanent magnet ring 5, the mass block 2 is located at a center of the permanent magnet ring 5 in the direction perpendicular to the first direction. That is, when the mass block 2 is in the balance position, a central axis of the mass block 2 coincides with a central axis of the permanent magnet ring 5.

When the mass block 2 is displaced under the action of the vibration mechanical energy and the mass block 2 moves in the direction perpendicular to the first direction (left-and-right direction), relative displacement between the mass block 2 and the permanent magnet ring 5 occurs. For example, when the mass block 2 moves leftwards, the permanent magnet ring 5 provides a rightward force for the mass block 2, to move the mass block 2 rightwards, and after several reciprocating motions, the mass block 2 returns to the balance position, achieving vibration damping.

In some embodiments, as illustrated in FIG. 1, an upper end face of the permanent magnet ring 5 is located above a first end face (upper end face) of the mass block 2 in the up-and-down direction, and a lower end face of the permanent magnet ring 5 is located below a second end face (lower end face) of the mass block 2 in the up-and-down direction.

In some embodiments, as illustrated in FIG. 1, the first wall face 112 is recessed in a direction away from the second wall face 113 to form a conical face, and the first end face of the mass block 2 is opposite the conical face in the first direction. That is to say, the first end face of the mass block 2 is opposite the first wall face 112 in the up-and-down direction. In at least one embodiment, as illustrated in FIG. 1, an apex of the first wall face 112 is located in the central axis of the sealed cavity 11. That is, the central axis of the sealed cavity 11 passes through the apex of the first wall face 112.

The first wall face 112 can provide a restoring force for the mass block 2. That is, the first wall face 112 may provide a force for the mass block 2 to return it to the balance position. For example, when the mass block 2 is not affected by vibration mechanical energy and is stationary relative to the housing 1, the mass block 2 is in the balance position. In at least one embodiment, when the mass block 2 is in the balance position, the central axis of the mass block 2 coincides with the central axis of the sealed cavity 11. When the mass block 2 is affected by vibration mechanical energy and displaced in the left-and-right direction, the mass block 2 deviates from the balance position. The mass block 2 approaches a portion of the first wall face 112, the magnetic liquid 3 located between a circumferential face of the mass block 2 and this portion of the first wall face 112 is extruded, and the magnetic liquid 3 applies a force to the mass block 2 and this portion of the first wall face 112. Since the forces are mutual, this portion of the first wall face 112 provides a force for the mass block 2 to return it to the balance position.

Alternately, the second wall face 113 is recessed in a direction away from the first wall face 112 to form a conical face, and the second end face (lower end face) of the mass block 2 is opposite the conical face in the first direction.

Alternately, the first wall face 112 is recessed in a direction away from the second wall face 113 to form a first conical face, the second wall face 113 is recessed in a direction away from the first wall face 112 to form a second conical face, the first end face of the mass block 2 is opposite the first conical face in the first direction, and the second end face of the mass block is opposite the second conical face in the first direction.

In some embodiments, each of the circumferential wall face 111, the first wall face 112 and the second wall face 113 is provided with an uneven structure. The uneven structure increases a contact area between the magnetic liquid 3 and the housing 1. The increase in contact area can increase frictional energy consumption, to enable the magnetic liquid damping shock absorber 100 to convert the vibration mechanical energy into thermal energy more rapidly and further to reduce vibration amplitude of the mass block 2 and return it to the balance position more rapidly, i.e., improving vibration damping effect and vibration damping efficiency of the magnetic liquid damping shock absorber 100.

In at least one embodiment, the uneven structure is a microstructure. That is, each of the circumferential wall face 111, the first wall face 112 and the second wall face 113 is surface treated. The treated circumferential wall face 111, first wall face 112 and second wall face 113 have increased surface frictional force, and can increase the frictional energy consumption, to enable the magnetic liquid damping shock absorber 100 to convert the vibration mechanical energy into thermal energy more rapidly, i.e. improving vibration damping effect and vibration damping efficiency of the magnetic liquid damping shock absorber 100.

In some embodiments, the permanent magnet 21 includes at least one permanent magnet unit 210. The permanent magnet unit 210 includes a second body 211 and a plurality of teeth 212. The plurality of teeth 212 are provided on the second body 211 and spaced apart in a circumferential direction of the second body 211.

The structural arrangement of the second body 211 and the plurality of teeth 212 increases contact area between the permanent magnet 21 and the magnetic liquid 3, the increase in contact area can increase frictional energy consumption, to enable the magnetic liquid damping shock absorber 100 to convert the vibration mechanical energy into thermal energy more rapidly and further to reduce vibration amplitude of the permanent magnet 21 and return it to the balance position more rapidly, i.e., improving vibration damping effect and vibration damping efficiency of the magnetic liquid damping shock absorber 100.

Figure 2:
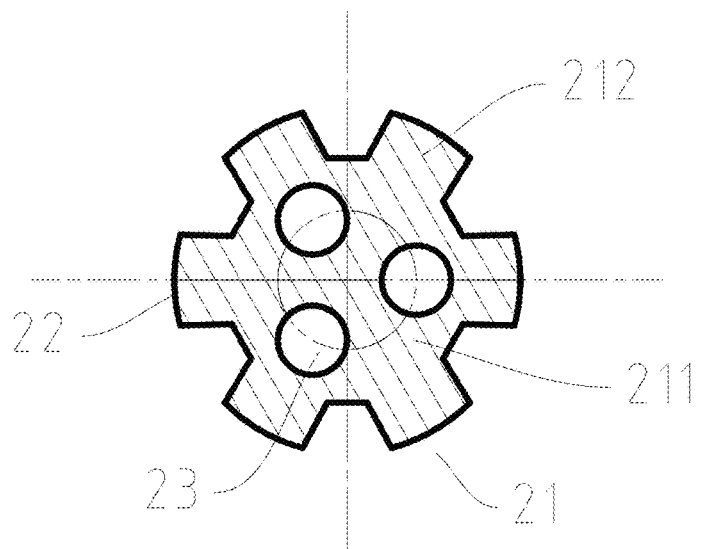
FIG. 2 is a cross section of a permanent magnet according to an embodiment of the present disclosure.

In some embodiments, as illustrated in FIG. 2, the plurality of teeth 212 are spaced apart about the circumferential face of the second body 211 and coupled to the circumferential face of the second body 211.

In some embodiments, the second body 211 is columnar. It could be understood that, a cross section of the columnar second body 211 may be circular, and may also be polygonal. In an embodiment, the cross section of the second body 211 is a rotationally symmetric shape, to make the structure of the permanent magnet 21 more reasonable. For example, the cross section of the second body 211 is a regular polygon or a circle.

In at least one embodiment, the second body 211 is cylindrical, that is, the cross section of the second body 211 is a circle.

In an embodiment, as illustrated in FIG. 2, the plurality of teeth 212 are provided on the circumferential face of the second body 211 at equal intervals in the circumferential direction of the second body 211. In other words, the plurality of teeth 212 are evenly arranged about the circumferential face of the second body 211. Thus, the cross section of the permanent magnet unit is a rotationally symmetric shape, the structure of the permanent magnet 21 is more reasonable, and the permanent magnet unit 210 forms a symmetric structure to make the permanent magnet 21 evenly stressed and not easy to deflect and collide with walls during movement, which causes fractures and failures of vibration damping.

In some embodiments, the permanent magnet 21 includes one permanent magnet unit 210, and the second body 211 is provided with one first through hole 23 extending in its axial direction. A central axis of the first through hole 23 coincides with a central axis of the second body 211. The axial direction of the second body 211 is the axial direction of the permanent magnet 21. The first through hole 23 is located in a center of the second body 211 and passes through the second body 211 in the axial direction of the second body 211. Provision of the first through hole 23 can further increase contact area between the magnetic liquid 3 and the permanent magnet 21, increase the frictional energy consumption, and improve vibration damping effect of the magnetic liquid damping shock absorber. Additionally, the provision of the first through hole 23 can also reduce resistance to the permanent magnet 21 during vibration damping movement, and make the movement of the permanent magnet 21 easier to facilitate generation of friction with the magnetic liquid 3. The mass of the permanent magnet 21 can also be reduced as much as possible, to make its movement in the sealed cavity more flexible and make the frictional energy consumption effect better. The purpose of coincidence of the central axis of the first through hole 23 and the central axis of the second body 211 is to make the structure of the permanent magnet 21 symmetric and make the permanent magnet 21 evenly stressed, to prevent the permanent magnet 21 from defecting and colliding with the housing during the vibration damping, which causes failures of vibration damping and even fractures of the permanent magnet 21, affecting service life of the magnetic liquid damping shock absorber 100.

In other embodiments, as illustrated in FIG. 2, the permanent magnet 21 includes one permanent magnet unit 210, the second body 211 is provided with a plurality of first through holes 23 extending in its axial direction, and the plurality of first through holes 23 are arranged evenly about the central axis of the second body 211 in the circumferential direction of the second body 211. In other words, each of the plurality of first through holes 23 passes through the second body 211 in the axial direction of the second body 211. The plurality of first through holes 23 being evenly arranged about the central axis of the second body 211 in the circumferential direction of the second body 211 means that a symmetric center line of the plurality of first through holes 23 coincides with the central axis of the second body 211. The purpose of provision of the plurality of first through holes 23 is to further increase contact area between the magnetic liquid 3 and the permanent magnet 21, further improving the vibration damping efficiency of the magnetic liquid damping shock absorber. The purpose of the plurality of first through holes 23 being evenly arranged about the central axis of the second body 211 in the circumferential direction of the second body 211 is to make the structure of the permanent magnet 21 symmetric to make the permanent magnet 21 evenly stressed.

By providing the permanent magnet 21 with the first through holes 23, the weight of the permanent magnet 21 can be reduced. The reduction in the weight of the permanent magnet 21 can facilitate suspension of the permanent magnet 21, to render it to be better suspended in the sealed cavity, further facilitating vibration damping of the magnetic liquid damping shock absorber 100. Additionally, since the weight of the permanent magnet 21 is reduced, when subjected to external vibration, the permanent magnet 21 is more prone to displacement, and produces friction with the magnetic liquid 3. Thus, the vibration damping effect of the magnetic liquid damping shock absorber 100 is further promoted.

Figure 3:
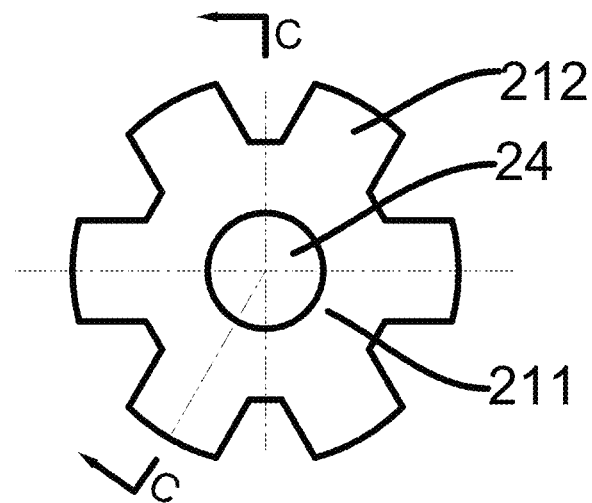
FIG. 3 is a top view of a permanent magnet according to another embodiment of the present disclosure.
Figure 4:
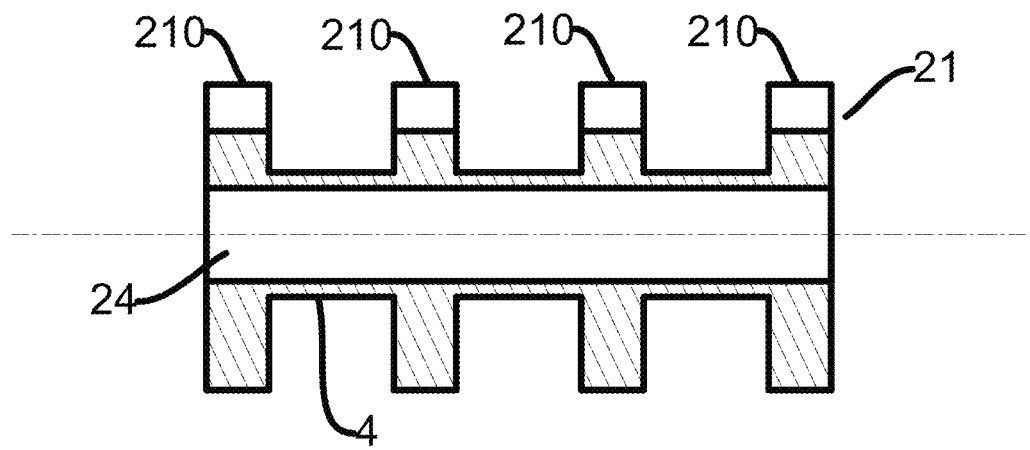
FIG. 4 is a cross section of the permanent magnet taken along line C-C in FIG. 3.
Figure 5:
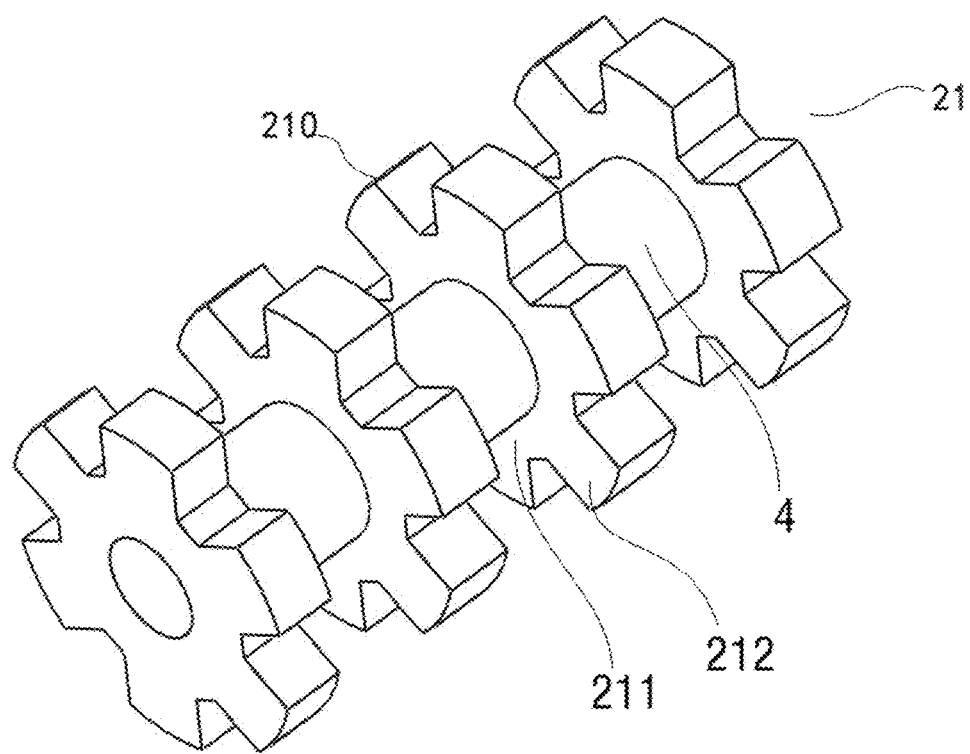
FIG. 5 is a perspective view of the permanent magnet in FIG. 3.

In some embodiments, as illustrated in FIGS. 3 to 5, the permanent magnet 21 includes a coupling part 4 and a plurality of permanent magnet units 210. The plurality of permanent magnet units 210 are coaxial, and two adjacent permanent magnet units 210 are coupled through the coupling part 4. The plurality of permanent magnet unit 210 being coaxial means that central axes of the plurality of permanent magnet units 210 coincide. For a single permanent magnet unit 210, the central axis of the permanent magnet unit 210 is just the central axis of its second body 211. Thus, central axes of the plurality of second bodies 211 of the plurality of permanent magnet units 210 coincide. Central axes of the plurality of permanent magnet units 210 coincide with each other such that the structure of the permanent magnet 21 is more reasonable.

In some embodiments, the coupling part 4 is cylindrical. The coupling part 4 has a first end and a second end opposite in its axial direction. For two adjacent permanent magnet units 210, the first end of the coupling part 4 is coupled to one of the two permanent magnet units 210, and the second end of the coupling part 4 is coupled to the other of the two permanent magnet units 210. For example, the first end of the coupling part 4 is coupled to the second body 211 of one of the two permanent magnet units 210, and the second end of the coupling part 4 is coupled to the second body 211 of the other of the two permanent magnet units 210. Thus, the coupling part 4 couples the plurality of permanent magnet units 210 in series along its axial direction. In some embodiments, a plurality of coupling parts 4 are provided.

In an embodiment, the coupling part 4 and the plurality of permanent magnet units 210 are coaxial. In other words, a central axis of the coupling part 4, central axes of the plurality of permanent magnet units 210, and central axes of the plurality of second bodies 211 of the plurality of permanent magnet units 210 coincide. The central axis of the coupling part 4, the central axes of the plurality of permanent magnet units 210, and central axes of the plurality of second bodies 211 are the central axis of the permanent magnet 21. An axial direction of the coupling part 4, axial directions of the plurality of permanent magnet unit 210, and axial directions of the plurality of second bodies 211 are the same as the axial direction of the permanent magnet 21. The coupling part 4 and the plurality of permanent magnet units 210 are coaxial such that the structure of the permanent magnet 21 is more reasonable.

In some embodiments, as illustrated in FIGS. 3 to 5, the permanent magnet 21 is provided with a second through hole 24, and the second through hole 24 passes through the coupling part 4 and the plurality of second bodies 211 in the axial direction of the permanent magnet 21. A central axis of the second through hole 24, the central axis of the coupling part 4, and the central axes of the plurality of second bodies 211 coincide. That is, the second through hole 24 is located at a center of the permanent magnet 21 and passes through the permanent magnet 21 in the axial direction of the permanent magnet 21. The provision of the second through hole 24 can further increase contact area between the magnetic liquid 3 and the permanent magnet 21 and increase frictional energy consumption, to improve the vibration damping efficiency of the magnetic liquid damping shock absorber 100. Additionally, the provision of the second through hole 24 can also reduce a resistance to the permanent magnet 21 during the vibration damping movement, and make the permanent magnet 21 more prone to movement to facilitate generation of friction with the magnetic liquid 3. It can also reduce the mass of the permanent magnet 21 as much as possible, to make its movement in the sealed cavity more flexible and to have better effect of the frictional energy consumption. The purpose of coincidence of the central axis of the second through hole 24, the central axis of the coupling part 4 and the central axis of the second body 211 is to make the structure of the permanent magnet 21 symmetric.

In other embodiments, the permanent magnet 21 is provided with a plurality of second through holes 24, and the plurality of second through holes 24 pass through the coupling part 4 and the plurality of second bodies 211 in the axial direction of the permanent magnet 21. That is, each of the plurality of second through holes 24 passes through the permanent magnet 21 in the axial direction of the permanent magnet 21. The plurality of second through holes 24 are evenly arranged about the central axis of the second body 211 in the circumferential direction of the second body 211. That is, a symmetric center line of the plurality of second through holes 24 and the central axis of the permanent magnet 21 coincide. The provision of the plurality of second through holes 24 is to further increase the contact area between the magnetic liquid 3 and the permanent magnet 21, and to further improve vibration damping efficiency of the magnetic liquid damping shock absorber 100.

Similar to first through hole 23, the second through hole 24 can also have an effect of reducing the weight of the permanent magnet 21, to facilitate suspension of the permanent magnet 21, and further improvement of the vibration damping effect of the magnetic liquid damping shock absorber 100.

In some embodiments, as illustrated in FIG. 5, the second body 211 is cylindrical, and an outer diameter of the coupling part 4 is less than an outer diameter of the second body 211, to maximize the contact area between the permanent magnet 21 and the magnetic liquid 3 and optimize the vibration damping effect of the magnetic liquid damping shock absorber 100.

In some embodiments, as illustrated in FIG. 5, the number of the teeth 212 of the plurality of permanent magnet units 210 is equal to each other. The plurality of teeth 212 of the plurality of permanent magnet units 210 are opposite in one-to-one correspondence in the axial direction of the permanent magnet 21. In other words, the plurality of teeth 212 of any two permanent magnet units 210 are opposite in one-to-one correspondence in the axial direction of the permanent magnet 21. The purpose of this arrangement is to reduce resistance to displacement of the permanent magnet 21 during the vibration damping while increasing the contact area between the permanent magnet 21 and the magnetic liquid 3, to maximize the vibration damping effect and the vibration damping efficiency of the magnetic liquid damping shock absorber 100. Additionally, this arrangement can also maintain the stability of the suspension of the permanent magnet 21 to the greatest extent, and prevent it from deflecting and colliding with the walls during the vibration damping movement.

In an embodiment, the permanent magnet 21 is axially magnetized. In at least one embodiment, the permanent magnet 21 selects NdFeB material.

In some embodiments, the sealed cavity 11 is cylindrical, and when the permanent magnet 21 is located in the balance position, the permanent magnet 21 and the sealed cavity 11 are coaxial. In at least one embodiment, a ratio of a length of the permanent magnet 21 in its axial direction to a length of the sealed cavity 11 in its axial direction is 0.5-0.7. Thus, there is sufficient space in the sealed cavity 11 for movement of the permanent magnet 21, and movement amplitude of the permanent magnet 21 in the sealed cavity 11 is big enough, to facilitate the frictional energy consumption and further facilitate improvement of the vibration damping effect and the vibration damping efficiency of the shock absorber. Additionally, it can also prevent the permanent magnet 21 from radially deflecting and colliding with the housing 1.

In at least one embodiment, as illustrated in FIGS. 2 and 3, outer side faces of the plurality of teeth 212 are located in a first circumference, and a ratio of a diameter of the first circumference to a diameter of the sealed cavity 11 is 0.6~0.8, to further prevent the permanent magnet 21 from radially deflecting and colliding with the housing 1 whiling ensure the space for the movement of the permanent magnet 21. That is to say, the outer side face 22 of each tooth 212 is a circular arc face, and the outer side faces 22 of the plurality of teeth 212 are located in the same cylindrical face. In other words, the plurality of teeth 212 can be deemed as: an outer circumferential face of the cylindrical permanent magnet block defines a plurality of slots extending in its axial direction and surrounding its circumferential direction, and a tooth 212 is formed between two adjacent slots.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may include at least one this feature. In the description of the present disclosure, "a plurality of" means at least two, for example, two, three, etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present application, unless specified or limited otherwise, a structure in which a first feature is "on" or "below" a second feature may include an embodiment in which the first feature is in direct contact with the second feature, and may also include an embodiment in which the first feature and the second feature are in indirect contact with each other via an intermediate medium. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, reference to term such as "an embodiment," "some embodiments," "an example," "a specific example," or "some examples," means that a particular feature, structure, material, or characteristic described in connection with the embodiment or example is included in at least one embodiment or example of the present disclosure. Schematic representations of the above terms throughout this specification are not necessarily referring to the same embodiment or example. Furthermore, the particular features, structures, materials, or characteristics may be combined in any suitable manner in one or more embodiments or examples. In addition, under the condition of not contradicting each other, those skilled in the art can incorporate and combine different embodiments or examples and features of different embodiments or examples described in this specification.

Although explanatory embodiments have been shown and described, it would be appreciated by those skilled in the art that the above embodiments cannot be construed to limit the present disclosure, and changes, alternatives, and modifications can be made in the embodiments within the scope of the present disclosure.

What is claimed is:

1. A magnetic liquid damping shock absorber, comprising:
   a housing defining a sealed cavity, the sealed cavity having a first wall face and a second wall face opposite in a first direction and a circumferential wall face located between the first wall face and the second wall face in the first direction;

a thermal insulating material layer provided on an outer surface of the housing, on a wall face of the sealed cavity or in a housing wall of the housing;

a mass block located in the sealed cavity, the mass block and the housing defining a magnetic liquid cavity therebetween; and a magnetic liquid filled in the magnetic liquid cavity, wherein the mass block is a permanent magnet, and the magnetic liquid is absorbed on the permanent magnet;

wherein the permanent magnet comprises a coupling part and a plurality of permanent magnet units, the plurality of permanent magnet units are coaxial, and two adjacent permanent magnet units are coupled through the coupling part; and wherein each of the plurality of permanent magnet units comprises a second body and a plurality of teeth, the plurality of teeth are provided on the second body and spaced apart in a circumferential direction of the second body, the plurality of teeth are coupled to a circumferential face of the second body, the second body is columnar, and a cross section of the second body is a rotationally symmetric shape.

2. The magnetic liquid damping shock absorber according to claim 1, wherein the housing wall of the housing defines a thermal insulating cavity, the thermal insulating material layer is formed by a phase-change material, and the phase-change material is filled in the thermal insulating cavity.

3. The magnetic liquid damping shock absorber according to claim 1, wherein the housing comprises a first body, a first end cap and a second end cap, the first body has a first opening and a second opening opposite in the first direction, the first end cap covers the first opening and is coupled to the first body, the second end cap covers the second opening and coupled to the first body; the first end cap is provided with a first thermal insulating cavity, the second end cap is provided with a second thermal insulating cavity, the housing wall of the housing is provided with a third thermal insulating cavity, the first thermal insulating cavity is filled with a first thermal insulating material to form a first thermal insulating material layer, the second thermal insulating cavity is filled with a second thermal insulating material to form a second thermal insulating material layer, and the third thermal insulating cavity is filled with a third thermal insulating material to form a third thermal insulating material layer.

4. The magnetic liquid damping shock absorber according to claim 1, wherein the plurality of teeth of each of the plurality of permanent magnet units are provided on the second body at equal intervals in the circumferential direction of the second body.

5. The magnetic liquid damping shock absorber according to claim 1, wherein the second body of each of the plurality of permanent magnet units is provided with one first through hole extending in its axial direction, a central axis of the first through hole coincides with a central axis of the second body; or the second body of each of the plurality of permanent magnet units is provided with a plurality of first through holes extending in its axial direction, the plurality of first through holes are evenly arranged about the central axis of the second body in the circumferential direction of the second body.

6. The magnetic liquid damping shock absorber according to claim 1, wherein a number of the plurality of teeth of each of the plurality of permanent magnet units is equal to each other, the plurality of teeth of each of the plurality of permanent magnet units are opposite in one-to-one correspondence in an axial direction of the permanent magnet.

7. The magnetic liquid damping shock absorber according to claim 1, wherein the coupling part is cylindrical, the coupling part and the plurality of permanent magnet units are coaxial, the permanent magnet is provided with a second through hole, and the second through hole passes through the coupling part and the second body of each of the plurality of permanent magnet units in an axial direction of the permanent magnet, a central axis of the second through hole, the central axis of the coupling part, and the central axes of the second bodies coincide; or the coupling part is cylindrical, the coupling part and the plurality of permanent magnet units are coaxial, the permanent magnet is provided with a plurality of second through holes, and the plurality of second through holes pass through the coupling part and the second body of each of the plurality of permanent magnet units in an axial direction of the permanent magnet, the plurality of second through holes are evenly arranged about the central axis of the second body in the circumferential direction of the second body.

8. The magnetic liquid damping shock absorber according to claim 1, further comprising a permanent magnet ring provided on the circumferential wall face, wherein the permanent magnet is located at an inner side of the permanent magnet ring, the permanent magnet is cylindrical, the permanent magnet has a central through hole, an axial direction of the central through hole is the first direction, the permanent magnet ring is annular, an axial direction of the permanent magnet ring and an axial direction of permanent magnet are both along the first direction, each of the permanent magnet ring and the permanent magnet is radially magnetized, and magnetizing directions of the permanent magnet ring and the permanent magnet are opposite.

9. The magnetic liquid damping shock absorber according to claim 1, wherein the mass block has a first end face and a second end face opposite in the first direction;

the first wall face is recessed in a direction away from the second wall face to form a conical face, and the first end face is opposite the conical face in the first direction; or the second wall face is recessed in a direction away from the first wall face to form a conical face, and the second end face is opposite the conical face in the first direction; or the first wall face is recessed in a direction away from the second wall face to form a first conical face, the second wall face is recessed in a direction away from the first wall face to form a second conical face, the first end face is opposite the first conical face in the first direction, and the second end face is opposite the second conical face in the first direction.

10. The magnetic liquid damping shock absorber according to claim 9, wherein each of the circumferential wall face, the first wall face and the second wall face is provided with an uneven structure.

* * * * *